United States Patent
Stadtfeld et al.

(10) Patent No.: US 12,222,021 B2
(45) Date of Patent: Feb. 11, 2025

(54) ELECTRIC DRIVES WITH HIGH REDUCTION TRANSMISSIONS

(71) Applicant: THE GLEASON WORKS, Rochester, NY (US)

(72) Inventors: Hermann J. Stadtfeld, Manderscheid (DE); Hanspeter Dinner, Menzingen (CH)

(73) Assignee: THE GLEASON WORKS, Rochester, NY (US)

( * ) Notice: Subject to any disclaimer, the term of this patent is extended or adjusted under 35 U.S.C. 154(b) by 242 days.

(21) Appl. No.: 17/424,531

(22) PCT Filed: Feb. 12, 2020

(86) PCT No.: PCT/US2020/017848
§ 371 (c)(1),
(2) Date: Jul. 21, 2021

(87) PCT Pub. No.: WO2020/167898
PCT Pub. Date: Aug. 20, 2020

(65) Prior Publication Data
US 2022/0097518 A1    Mar. 31, 2022

Related U.S. Application Data (60) Provisional application No. 62/805,993, filed on Feb. 15, 2019.

(51) Int. Cl.
*F16H 1/14* (2006.01)
*B60K 17/16* (2006.01)
(Continued)

(52) U.S. Cl.
CPC .......... *F16H 1/145* (2013.01); *B60K 17/165* (2013.01); *B60K 17/354* (2013.01); *F16H 1/206* (2013.01)

(58) Field of Classification Search
CPC ...... F16H 1/145; F16H 1/206; F16H 37/0813; F16H 37/0833; F16H 37/10; B60K 17/165; B60K 17/354; B60K 17/04
See application file for complete search history.

(56) References Cited

U.S. PATENT DOCUMENTS 3,213,700 A * 10/1965 Brownyer ............... F16H 1/145
74/424
4,651,587 A *  3/1987 Anderson ............. F16H 55/082
475/228

(Continued)

FOREIGN PATENT DOCUMENTS

EP         0211199 A1     2/1987
WO    WO-2007048516 A2 *  5/2007  ............ B23F 17/001
WO    WO-2018187299 A1 * 10/2018  ............. B60K 17/02

OTHER PUBLICATIONS

International Search Report and Written Opinion for PCT/US2020/017848, ISA/EPO, Oct. 1, 2020, 13 pgs.

*Primary Examiner* — Bobby Rushing, Jr.
(74) *Attorney, Agent, or Firm* — Robert L. McDowell (57) ABSTRACT

A powertrain of a vehicle comprising an electric motor (16) having a drive shaft (11) wherein the drive shaft is oriented preferably perpendicular to the common axis (Aw) of the wheels (18) which the powertrain is intended to drive (i.e. rotate). The drive shaft of the electric motor is mechanically connected to the axles (20, 22) of the wheels, which are aligned with the common axis, via a transmission (10) having at least one pair of mating gears (12, 14), preferably with one of the pair of mating gears being an offset pinion (14), and with the reduction ratio of the transmission being in the range of about 6 to about 15 with the pinion having 2 to 6 teeth.

13 Claims, 13 Drawing Sheets

(51) Int. Cl.
  *B60K 17/354* (2006.01)
  *F16H 1/20* (2006.01)

(56) References Cited

U.S. PATENT DOCUMENTS

| | | | |
|---|---|---|---|
| 6,514,169 B2 * | 2/2003 | Turner | B60K 17/36 |
| | | | 475/222 |
| 8,960,341 B2 | 2/2015 | Weber | |
| 8,967,012 B2 * | 3/2015 | Napau | F16H 55/082 |
| | | | 74/462 |
| 9,022,893 B2 | 5/2015 | Hirao et al. | |
| 9,341,238 B2 * | 5/2016 | Peura | F16H 1/14 |
| 9,616,746 B2 * | 4/2017 | Peura | F16D 11/14 |
| 9,777,797 B2 * | 10/2017 | Okada | H02K 21/14 |
| 10,006,533 B1 | 6/2018 | Strandberg | |
| 2005/0054471 A1 | 3/2005 | Fleytman | |
| 2005/0124451 A1 | 6/2005 | Morikawa | |
| 2010/0155168 A1 | 6/2010 | Mies | |
| 2011/0017005 A1 * | 1/2011 | Batdorff | F16H 1/145 |
| | | | 74/424.5 |
| 2014/0116201 A1 * | 5/2014 | Spiegel | B60L 15/2036 |
| | | | 74/661 |
| 2019/0024772 A1 * | 1/2019 | Ketchel | F16H 57/021 |
| 2019/0031023 A1 * | 1/2019 | Ketchel | B60K 17/35 |

* cited by examiner

Motor in Center of Front Axle Directed Forward & Horizontally Oriented

FIG. 11

Motor in Center of Front Axle Directed Forwards Under a 20° Angle

FIG. 12

Motor in Center of Front Axle Directed Towards Back & Horizontally Oriented

FIG. 13

All Wheel Drive Vehicle With Hypoid Reductions

ELECTRIC DRIVES WITH HIGH REDUCTION TRANSMISSIONS

FIELD OF THE INVENTION

The invention is directed to the powertrain of electric vehicles and in particular to the orientation of an electric motor and transmission.

BACKGROUND OF THE INVENTION

Electric driven vehicles have been known for many years. A conventional drive design comprises an electric motor and some type of transmission dedicated to, and located at or immediately adjacent to, each driven wheel. These drive arrangements are known in the art as wheel-adjacent motor configurations. Examples of such designs are disclosed by, for example, US 2010/0155168; US 2001/0011611; U.S. Pat. Nos. 1,543,044; and 1,540,526. Designs of this type add complexity, weight and cost to a vehicle and while such designs may be suitable for some heavy trucks, they are generally unsuitable for application in today's electric passenger vehicles (e.g. cars, light trucks, etc.).

Compact electric vehicles (e.g. cars, light trucks, etc.) require a cost effective and compact solution for the location of the electric motor and the transmission. Even small electric vehicles require a transmission if the maximal possible motor efficiency has to be available in the majority of drive conditions.

As an example, the torque and efficiency optimal RPM of an 80 KW electric motor for a compact vehicle is between 6000 and 10000 RPM. If the nominal driving speed is 80 km/h and the optimal motor speed is 10,000 RPM, the optimal ratio between motor and wheels (using a wheel diameter of 410 mm) is 1×9.66:

$$i = \frac{(n_{Motor} * D * \pi)}{V}$$

Where:
i . . . Transmission ratio
$n_{Motor}$ . . . Optimal motor RPM [1/min]
D . . . Outer tire diameter [m]
V . . . Average vehicle speed [m/min]

Figure 1:
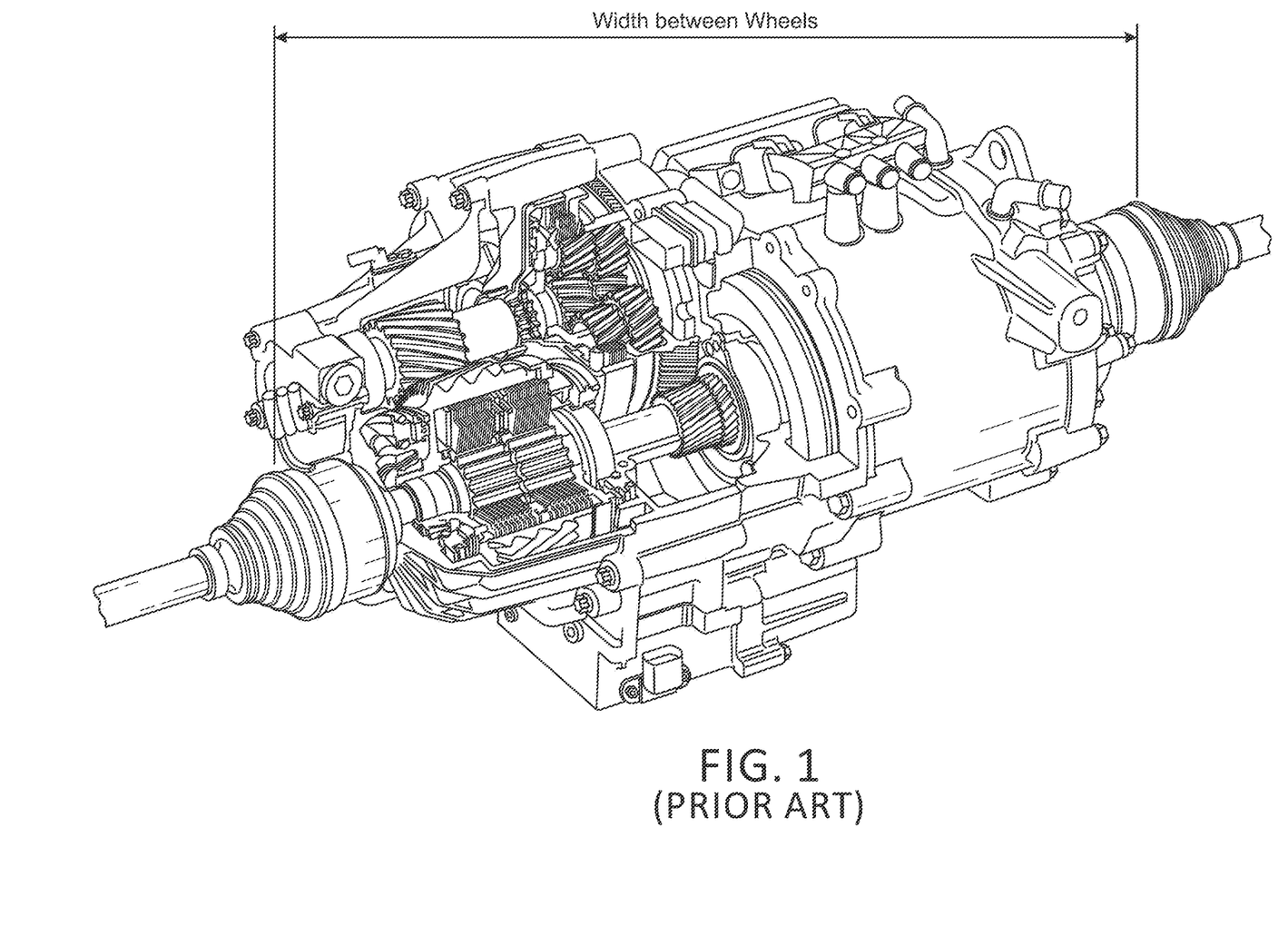
FIG. 1 illustrates a conventional electric motor and in-line transmission arrangement.

A variety of electric drive (i.e. eDrive) concepts have been developed. One example is shown in FIG. 1 wherein the motor and transmission are arranged between the front wheels with the motor axis being parallel to the axis of the wheels and where only one motor is used for driving both wheels. The design, known as an "inline design", is very compact but presents some major obstacles which include:
Large width between the front wheels used for drive unit
Asymmetric weight distribution
Higher heat radiation to the wheel and tire on the side of the electric motor The large "width between the wheels" (i.e. required width of the motor and transmission between the wheels) results in short drive shafts. Each of the drive shafts has two constant-velocity joints (i.e. CV-joints) which wear fast in the case of short drive shafts due to the steering inclination and control arm swings. This will also result in a reduced efficiency and front axle noise.

The asymmetric weight distribution has to be offset with other asymmetric vehicle components such as the battery. However, there will still be a negative influence on the dynamic behavior of the vehicle.

The permanent heat radiation of the electric motor in FIG. 1 may increase the temperature of the adjacent tire by 10 to 20° C. Temperature insulation and an additional cooling fan can reduce the temperature of the hot tire and the electric motor (i.e. e-motor) but the consumption of electrical energy for the evacuation of motor heat is not something electric vehicle (i.e. EV or e-vehicle) manufacturers like to see.

SUMMARY OF THE INVENTION

The invention is directed to a powertrain of a vehicle comprising an electric motor having a drive shaft wherein the drive shaft is oriented preferably perpendicular to the common axis of the wheels which the powertrain is intended to drive (i.e. rotate). The drive shaft of the electric motor is mechanically connected to the axles of the wheels, which are aligned with the common axis, via a transmission comprising at least one pair of mating gears, preferably with one of the pair of mating gears being an offset pinion, and with the reduction ratio of the transmission being in the range of about 6 to about 15 with the pinion having 2 to 6 teeth.

DETAILED DESCRIPTION OF THE PREFERRED EMBODIMENT

The terms "invention," "the invention," and "the present invention" used in this specification are intended to refer broadly to all of the subject matter of this specification and any patent claims below. Statements containing these terms should not be understood to limit the subject matter described herein or to limit the meaning or scope of any patent claims below. Furthermore, this specification does not seek to describe or limit the subject matter covered by any claims in any particular part, paragraph, statement or drawing of the application. The subject matter should be understood by reference to the entire specification, all drawings and any claim below. The invention is capable of other constructions and of being practiced or being carried out in various ways. Also, it is understood that the phraseology and terminology used herein is for the purposes of description and should not be regarded as limiting.

The details of the invention will now be discussed with reference to the accompanying drawings which illustrate the invention by way of example only. In the drawings, similar features or components will be referred to by like reference numbers.

The use of "including", "having" and "comprising" and variations thereof herein is meant to encompass the items listed thereafter and equivalents thereof as well as additional items. Although references may be made below to directions such as upper, lower, upward, downward, rearward, bottom, top, front, rear, etc., in describing the drawings, these references are made relative to the drawings (as normally viewed) for convenience.

Figure 2:
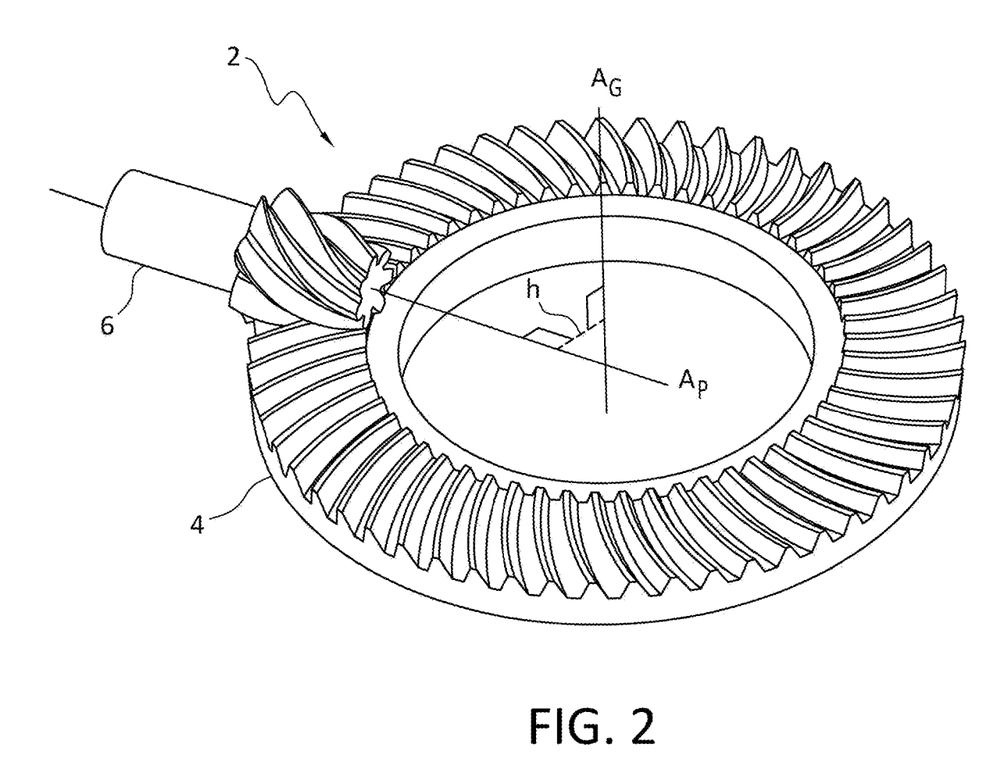
FIG. 2 shows a bevel hypoid gearset comprising a bevel ring gear and a hypoid pinion.

In one embodiment of the invention, an electric motor of a vehicle is reoriented from the conventional in-line orientation of FIG. 1, preferably by ninety degrees, which enables the establishment of a symmetric electric drive unit capable of providing an operative ratio between electric motor and wheels solely by a single stage reduction. For example, the gearset shown in FIG. 2 is a bevel gearset 2 comprising a bevel ring gear 4 and a mating hypoid pinion 6. In this example, the ring gear has 55 teeth and the pinion has 7 teeth thereby providing a gear tooth ratio ($Z_G/Z_P$) for the gearset of 55/7 or 7.86. In a bevel hypoid gearset, the ring gear and pinion operate on non-parallel and non-intersecting axes, $A_G$ and $A_P$ respectively, (FIG. 2) wherein the distance, h, between parallel planes, one containing the ring gear axis, $A_G$, and the other containing the pinion axis, $A_P$, is usually referred to as the offset, pinion offset or hypoid offset.

Figure 3:
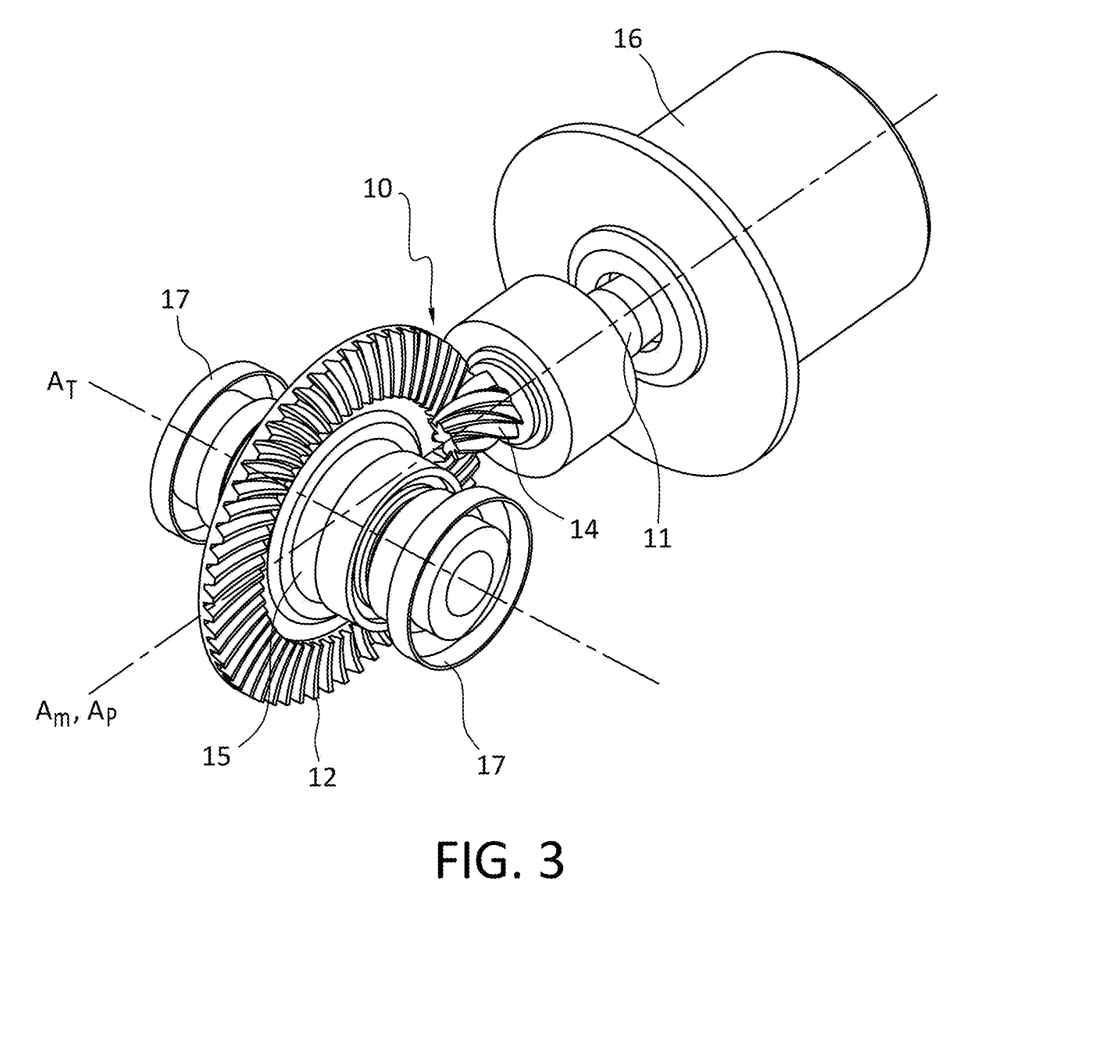
FIG. 3 shows a single stage hypoid transmission.

FIG. 3 illustrates a transmission having a single stage reduction 10, comprising a bevel ring gear 12 and mating hypoid pinion 14. The transmission comprises at least one input and at least one, preferably at least two, outputs. Input power is provided by an electric motor 16. A transmission housing and differential (located at 15) are not shown for reasons of viewing clarity. The electric motor 16 is oriented such that the axis of rotation $A_m$ of the drive shaft of the electric motor 16 is preferably coincident with the axis $A_P$ of hypoid pinion 14 and is preferably substantially perpendicular to the transmission output axis $A_T$ about which the ring gear 12 rotates in the transmission.

Compact and low priced electric vehicles require a simple, compact and cost effective transmission between electric motor and front or rear wheel or wheels. Small compact vehicles with electric drive mostly do not require top speeds above 90 km/h. Their major application is inner city driving for commuting or shopping. All important objectives for such a vehicle can be fulfilled with one electric motor and one single stage hypoid transmission positioned, preferably mid-way, between a pair of wheels, as shown in FIG. 4 for example.

Figure 4:
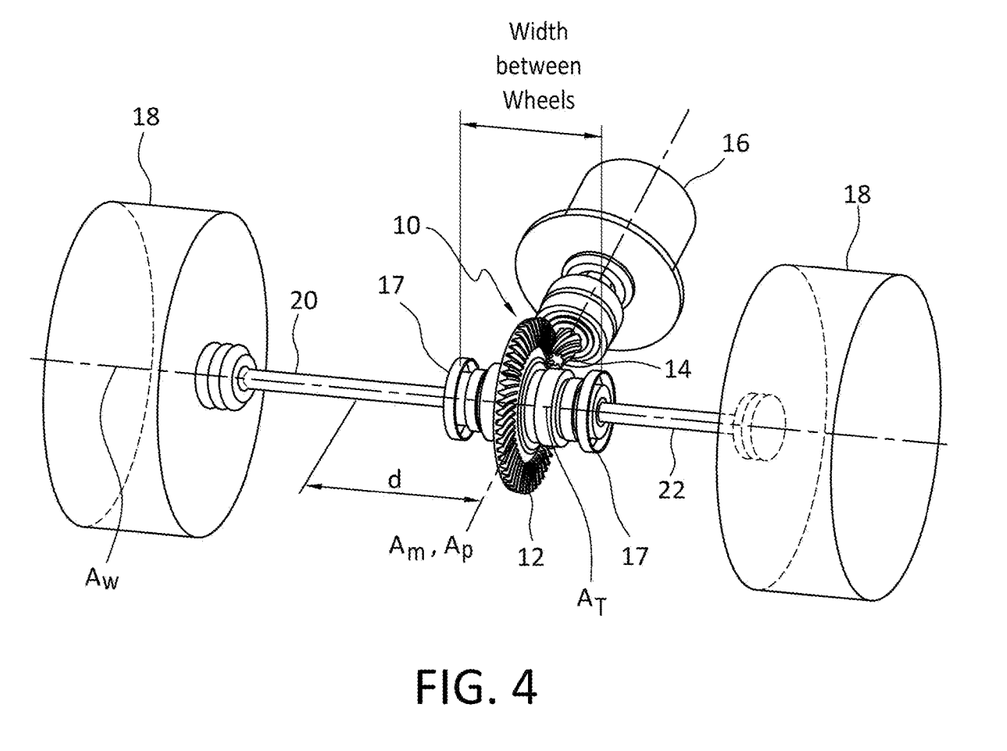
FIG. 4 illustrates an electric drive unit with a single stage hypoid reduction located between the wheels of a vehicle.

FIG. 4 illustrates a transmission comprising a single stage reduction 10 (bevel ring gear 12 and mating hypoid pinion 14) and an electric motor 16 wherein the motor 16 is oriented such that the axis of rotation $A_m$ of the drive shaft of the electric motor 16 is preferably coincident with the axis $A_P$ of hypoid pinion 14 and is oriented preferably substantially perpendicular to the axis $A_T$ about which the ring gear 12 rotates. Axis $A_w$ is a common axis about which the wheels 18 rotate. Axis $A_W$ preferably extends in a widthwise direction of a vehicle and is preferably parallel to and aligned with, preferably coincident with, wheel axles 20 and 22 and ring gear axis $A_T$.

The small width of the transmission allows for a reduced width between the wheels of FIG. 4 making for a compact vehicle solution which allows optimal packaging and an ideal vehicle weight distribution. The gearset ratio need not be larger than 1×15, although the ratio may be larger. A second gearset, which can serve to adjust the vehicle speed more optimally to the electric rotor RPM, is not required but may be included. The single stage transmission of FIG. 4 has a ratio of 7.86 (7×55) and a back driving coefficient of about 0.3, which is acceptable for energy recuperation during coast operation.

Electric drive reductions require high efficiency as well as a good back driving ability. Back driving ability is the degree of ease of which a motor can be driven by its attached load when power is removed from the motor. The back driving is important in two ways. The first reason is the regeneration of electrical energy in case the vehicle driver takes a foot off the accelerator pedal. The electric motor is switched to generator operation and the kinetic energy of the vehicle is used to re-charge the battery, rather than being wasted by simply using the brakes. The second reason for the back driving ability is to avoid wheel locking in case of an abrupt release of the accelerator pedal. The gearset in FIG. 2 fulfills both requirements very well. Preferably the ring gear is phosphatized, or equivalently coated, in order to increase the efficiency of the gearset before break-in and avoid costly polishing. As the phosphor layer breaks down, the break-in of the gearset is finished and the initial efficiency will be maintained. Preferably both members of the gearset have been heat treated and ground after heat treatment.

The electric drive unit in FIG. 4 has a high degree of symmetry and moves the heat radiating electric motor away from the tire that was exposed to the heat from the motor as is the case with the inline design of FIG. 1. The distance between the drive shaft flanges 17 presents a very small "width between wheels, of the motor which allows for rather long drive shafts. With the possibility to face the motor either towards the front or towards the back of a vehicle (i.e. in the lengthwise direction of the vehicle), the ideal weight distribution and optimal packaging for a particular vehicle can be achieved. This very compact design with only two gears and two shafts can be manufactured very cost effective and presents a very good electric drive solution for a small compact electric vehicle.

The invention also contemplates even higher ratios with a single stage hypoid gearset, such as by utilizing pinions having six or fewer teeth (2, 3, 4, 5 or 6 teeth for example) or preferably five or fewer teeth (2, 3, 4 or 5 teeth for example), as well as the combination of a hypoid gearset and a cylindrical reduction gearset while still preserving the basic advantages mentioned above.

An aspect that one may consider is the maximal sliding velocity between the tooth flanks in mesh, generated by the hypoid offset of the pinion. Conventional hypoid gearsets (e.g. 1×3 ratio) with a typical offset as used in automotive and truck applications (e.g. 19-38 mm) have about 125 m/min relative sliding velocity when the vehicle is driving at a speed of 100 km/h. An electric drive with hypoid gearset ratio of 1×9.66 and a motor speed of 10,000 RPM, for example, generates a relative sliding velocity of 333 m/min. This is more than twice the relative surface sliding of the conventional hypoid gearset mentioned above. Under such conditions, it is preferable to use high pressure synthetic hypoid oil as well as tooth surface coatings, as previously discussed, in order to achieve the necessary gear life with respect to tooth surface damage.

While the number of teeth of the pinion may be an indicator of back driving ability, it is not the only indicator of the back driving ability of a hypoid gearset. The spiral angle of the pinion must also be considered. Generally speaking, the larger the spiral angle, the lower the back driving ability becomes. The following categories of spiral angles may be defined:

Small spiral angle: 0° to 20°
Medium spiral angle: 20° to 35°
Large spiral angle: 35° to 65°
Very large spiral angle: 65° to 90°

Figure 5:
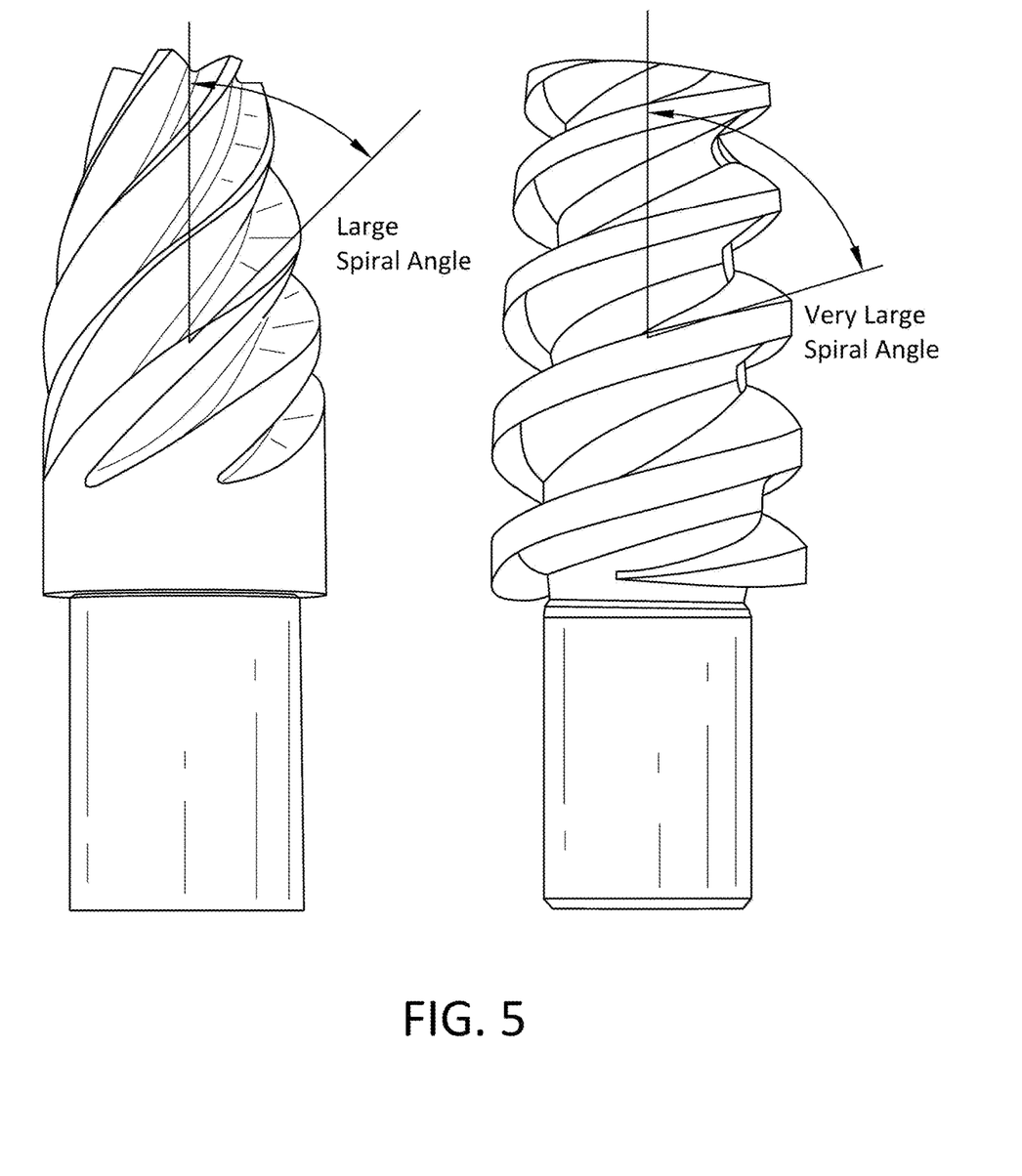
FIG. 5 shows a large pinion spiral angle and very large spiral angle.

Two examples, one with a large spiral angle and one with a very large spiral angle are shown in FIG. 5. A certain number of teeth on a small diameter results in a lower spiral angle than the same number of teeth on a large diameter. In order to take the opposing effects into account, the back driving ability may be determined by considering the correct geometry and an assumed coefficient of friction of 0.08. The fraction $T_{br}/T_{dr}$, (back driving opposing force $T_{br}$/back driving force Tar) is called the Back Driving Coefficient $C_{BD}$. A value of $C_{BD}=1.0$ and above indicates a self-locking condition. A value of $C_{BD}=0$ cannot be achieved. In the Table below, the results of $C_{BD}$ for five different hypoid gearsets are shown.

| Number of Pinion Teeth | Coefficient of Friction | Back Driving Coefficient $C_{BD}$ | Condition of Back Driving |
|---|---|---|---|
| 17 | $\mu = 0.08$ | $T_{br}/T_{dr} = 0.091$ | Not Self Locking |
| 5 | $\mu = 0.08$ | $T_{br}/T_{dr} = 0.324$ | Not Self Locking |
| 3 | $\mu = 0.08$ | $T_{br}/T_{dr} = 0.305$ | Not Self Locking |
| 2 | $\mu = 0.08$ | $T_{br}/T_{dr} = 0.336$ | Not Self Locking |
| 1 | $\mu = 0.08$ | $T_{br}/T_{dr} = 1.295$ | Self Locking |

While a 17-tooth automotive hypoid pinion has a $C_{BD}$ of 0.091 which is excellent, the 1-tooth pinion example is self-locking with a $C_{BD}$ of 1.295. The 2- to 5-tooth pinions have very similar coefficients, with the unexpected low coefficient of the 3 tooth pinion, which is lower than the 5-tooth pinion. Additionally, optimization of certain ring gear and/or pinion parameters, such as tooth depth, pinion diameter and face angles may further enhance back driving ability.

For example, if an ideal ratio for an electric drive hypoid reduction is in the range of 15, then one example is to select 4 pinion teeth and 60 ring gear teeth (preferably 59 or 61 because of hunting tooth advantage, i.e. no common factor in the numbers of teeth in ring gear and mating pinion). Such a gearset should preferably be optimized with the goal to achieve a back driving coefficient $C_{BD}=0.3$. or below.

Figure 6:
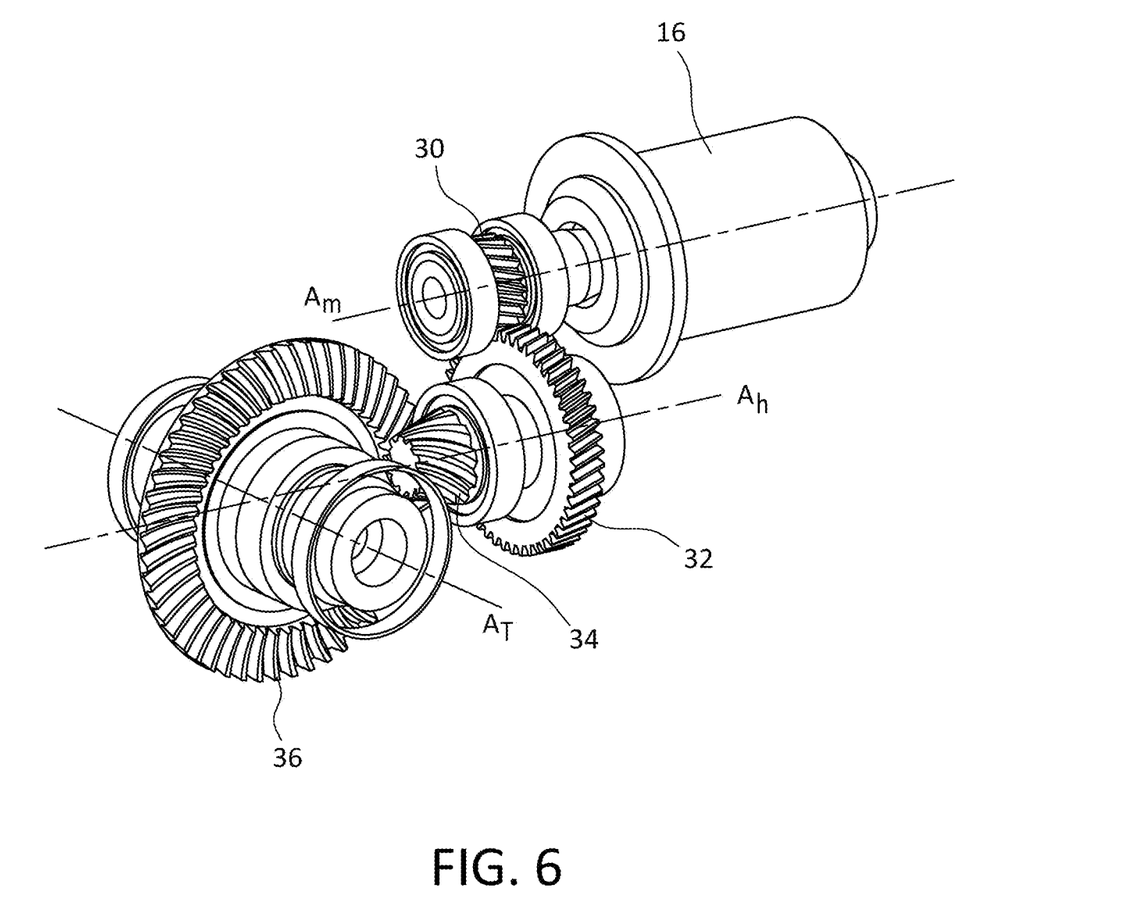
FIG. 6 illustrates a dual stage reduction cylindrical-hypoid transmission.

Another embodiment of an electric drive transmission is shown in FIG. 6. This is a dual stage reduction with a first cylindrical reduction 30, 32 of 2.33 (21×49) and a second hypoid reduction 34, 36 of 4.4 (11×51) which results in an overall ratio of 10.27. The driving efficiency of the dual stage transmission will be higher than the transmission in FIG. 4 because of the lower ratio in the hypoid stage and the back driving coefficient of about 0.15 which is also better than the transmission in FIG. 4.

Figure 7:
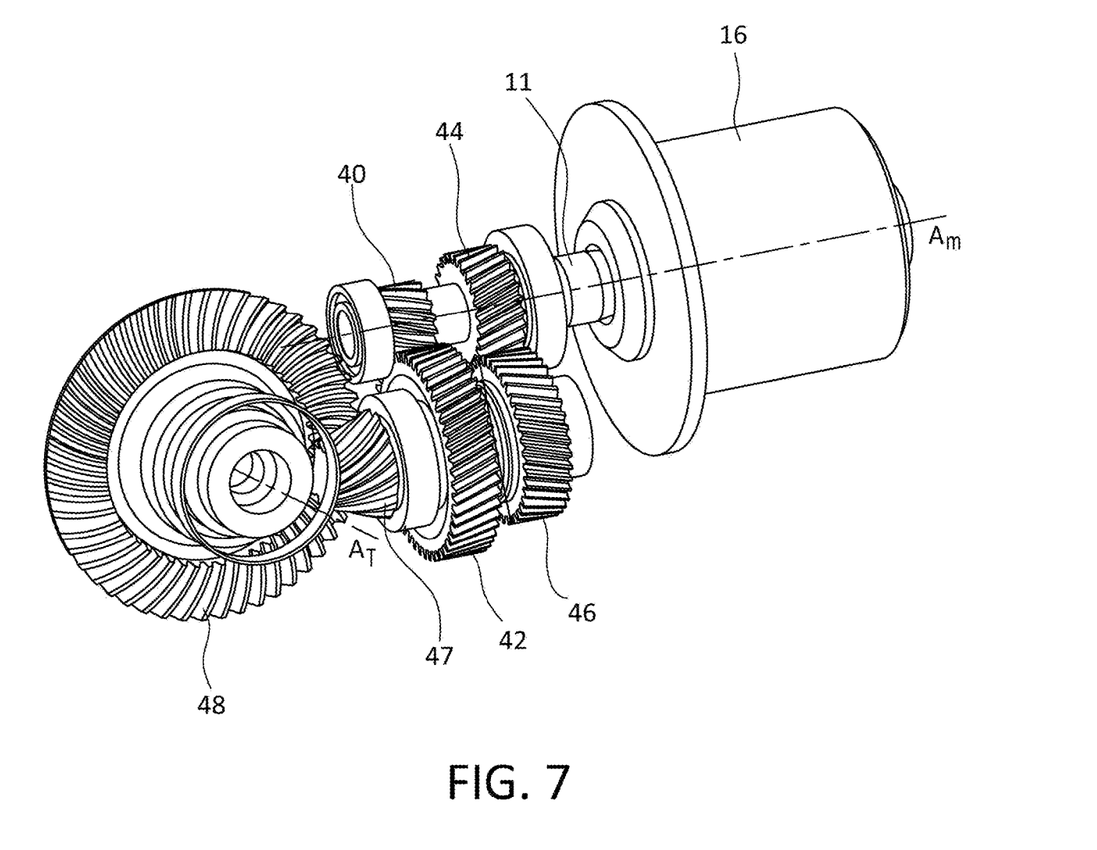
FIG. 7 illustrates a dual reduction cylindrical-hypoid transmission.

Another embodiment of an electric drive transmission is shown in FIG. 7 wherein a dual reduction cylindrical-hypoid transmission is shown. Midsize or premium electric vehicles may benefit from a transmission of this type. A clutch unit (e.g. electromagnetically or hydraulically actuated) can acti-vate either a cylindrical ratio 40, 42 of 1.46 (26×38) or a cylindrical ratio 44, 46 of 3 (16×48). The hypoid reduction 47, 48 has a ratio of 3.85 (13×50). In forward driving with lower speeds (e.g. up to 50 km/h) the overall ratio can be switched to 3·3.85=11.55. As the speed increases above 50 km/h, the electric motor will operate with less efficiency and the second cylindrical gear pair 40, 42 can be activated. The overall ratio changes to 1.46·3.85=5.62 which enables the motor to reduce its RPM to a more efficient operation.

The transmission in FIG. 7 is of particular interest in a coast operation, when the motor is switched to generator mode to utilize the kinetic energy of the vehicle to recharge the battery. If the speed is, for example, 80 km/h (transmission ratio=5.62) the transmission will switch the higher ratio of 11.55 in order to give the generator (motor) more RPM for a more efficient electricity generation. This embodiment provides flexibility while maintaining advantages such as packaging, good weight distribution as well as heat radiation away from one of the wheels as discussed above with respect to the single-stage and dual-stage transmissions.

Figure 8:
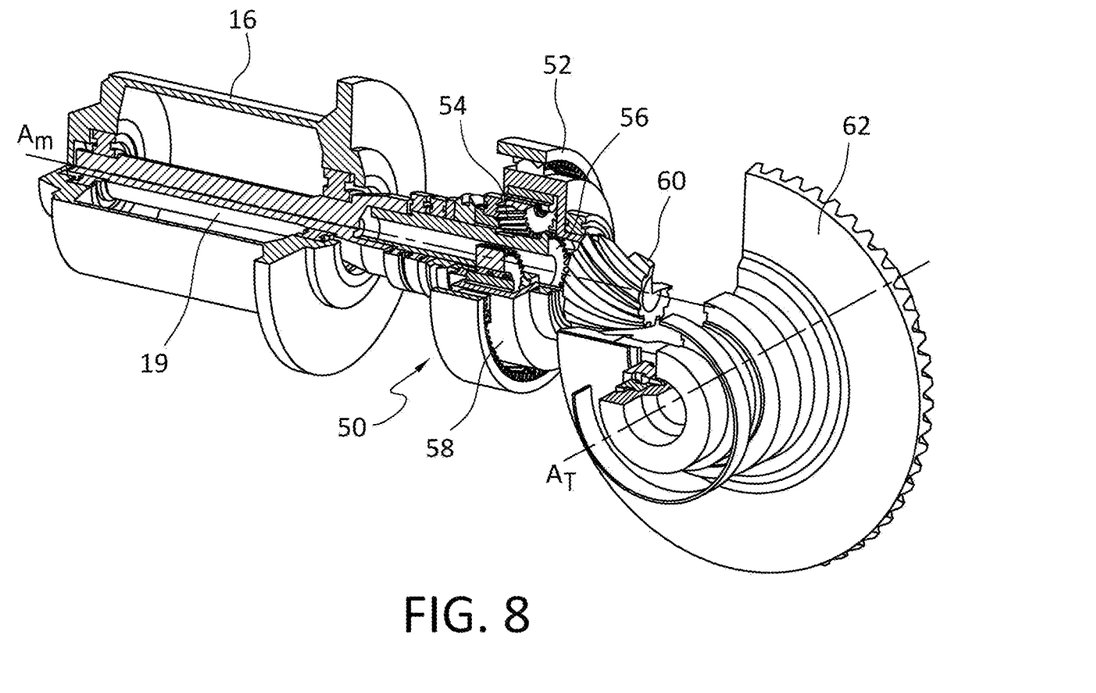
FIG. 8 shows a planetary-hypoid reduction transmission.

Another embodiment comprising a planetary-hypoid reduction transmission is shown in FIG. 8. The planetary gear system 50 comprises an internal ring gear 52, one or more planet gears 54, a sun gear 56 and a cage or carrier 58. The motor shaft 19 is connected to the sun gear 56 and the hypoid pinion 60 is connected to, or integral with, the cage 58 as planetary output. Ring gear 62 rotates about axis $A_W$ which is the axis of rotation of the wheels being driven (see FIG. 4).

In a planetary gear system, the sun gear may have a different number of teeth than the planet gears. However, in the following example, the planet gears each have the same number of teeth (e.g. 29) as the sun gear (29) and the internal ring gear has three times the number of teeth (e.g. 87) as the sun gear. Regardless of whether the sun gear has the same number teeth or a different number of teeth than the planet gears, two ratios are possible with a planetary system. The planetary-hypoid transmission requires a clutch which can connect the internal ring gear 52 to either of (a) the sun gear (ratio 1.0), wherein the ring gear rotates with the planet gears and sun gear at the same speed, or (b) the stationary transmission housing (not shown) (ratio 4.0) wherein the ring gear does not rotate. Because one of the two possible ratios is always 1.0, the flexibility of the planetary transmission is lower than the dual reduction cylindrical-hypoid version. The planetary-hypoid transmission would require the highest possible hypoid reduction ratio which, as discussed earlier, delivers a lower back driving ability. In FIG. 8, the hypoid ratio is 5.18 (11×57). The overall ratio in $1^{st}$ gear is 1.0 5.18=5.18 and in $2^{nd}$ gear is 4.05·18=20.72.

Figure 9:
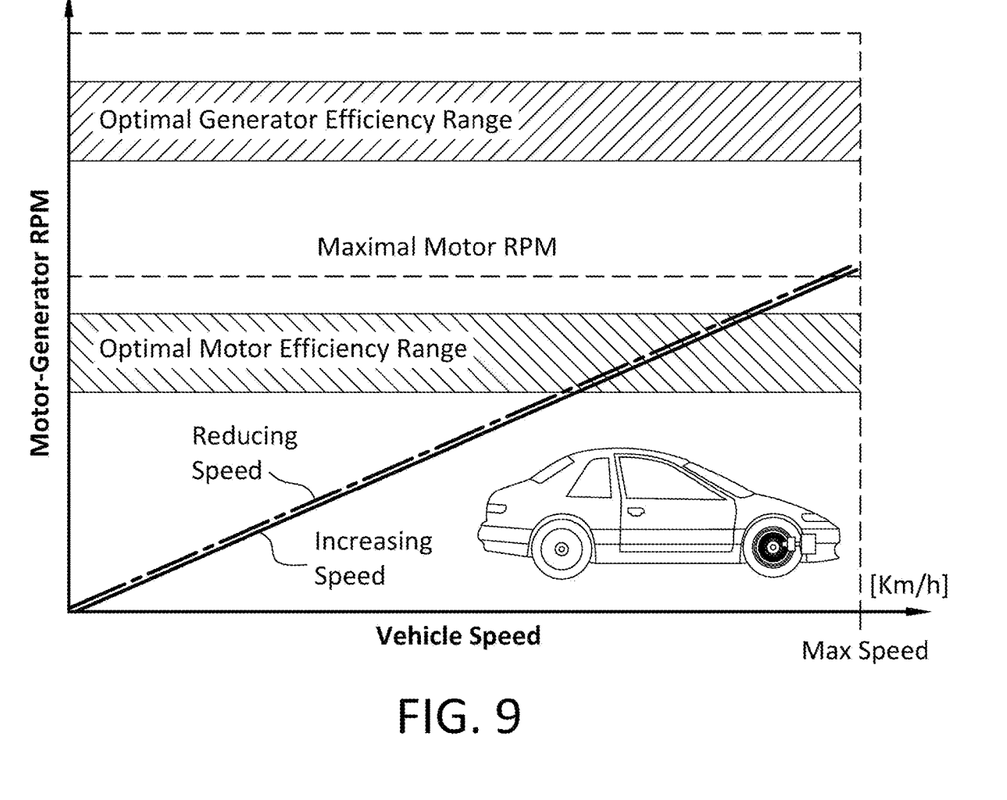
FIG. 9 shows a speed diagram for single speed transmission.

In the case of a single speed transmission (FIG. 4), the relationship between motor RPM and vehicle speed is of course proportional as shown in FIG. 9. This applies if the electrical prime mover is in motor mode or in generator mode. The efficiency optimal operating RPM of a motor which is rated for 15,000 RPM maximum is in the vicinity of 8,000 to 10,000 RPM. This is the speed range with high efficiency in the case of average load. If the load is small, then the efficiency optimal RPM is lower and vice versa if the load is higher. The ratio of a single stage transmission is preferably defined such that the majority of the driving falls into the optimal motor efficiency range. FIG. 9 also indicates that the increasing speed graph is only for a short period within the optimal motor efficiency range. When the operator takes a foot of the accelerator pedal, the motor-generator control can take the leads off the motor (i.e. no power going into or coming out of the motor) and the vehicle coasts down naturally. If the brake pedal is applied lightly, the control can switch the motor to generator mode while the disk brakes are not yet engaged. Only when the brake pedal is pressed hard do the disk brakes kick in and support the electric generator brake.

Figure 10:
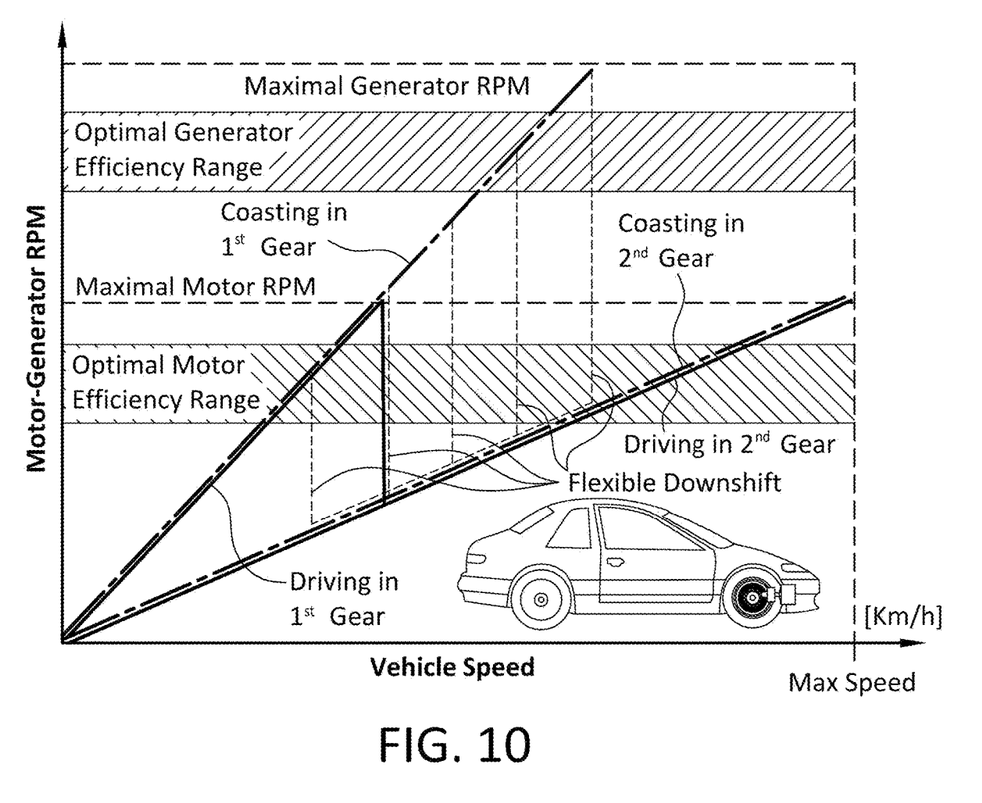
FIG. 10 shows a speed diagram for dual speed transmission.

In case of a dual speed transmission, the vehicle's electronic control module can decide which of the two ratios with respect to the load would provide a better motor efficiency. FIG. 10 shows a typical speed diagram with the first ratio larger than a second ratio. The first gear is active until the maximal motor RPM is reached. Then the clutch switches to the second gear which stays active until the maximal motor speed is reached again. The speed graph in FIG. 10 has two sections which pass the optimal motor efficiency range. Depending on the duty cycle of the vehicle, the two speed transmission can double the operating time within the optimum efficiency speed range and significantly reduce the energy consumption of the vehicle.

Depending on gentle coasting to a full stop (leads off motor) or breaking light or hard, the vehicle's electronic control module can regulate the downshift in order to optimize the brake force and maximize the battery re-charging. The flexible downshift is shown in FIG. 10 as dashed lines. The following breaking conditions may be considered:

Foot of the accelerator—Coasting with leads off the motor/generator;

Pressing the brake pedal up to 30% of its travel—Braking force proportional to the pedal force by controlled downshift and a controlled generator charging conditions (ABS function still active by generator pulse charging);

Pressing the brake pedal beyond 30% travel—Mechanical brake applied in addition to the generator brake.

Some electric vehicles, even larger premium models, realize breaking by releasing the accelerator pedal. This technology reduces the driving comfort, is counterintuitive and can lead to unsafe driving conditions. It requires a steady and unnatural foot positions which fatigues the accelerator foot as well as the driver.

Figure 11:
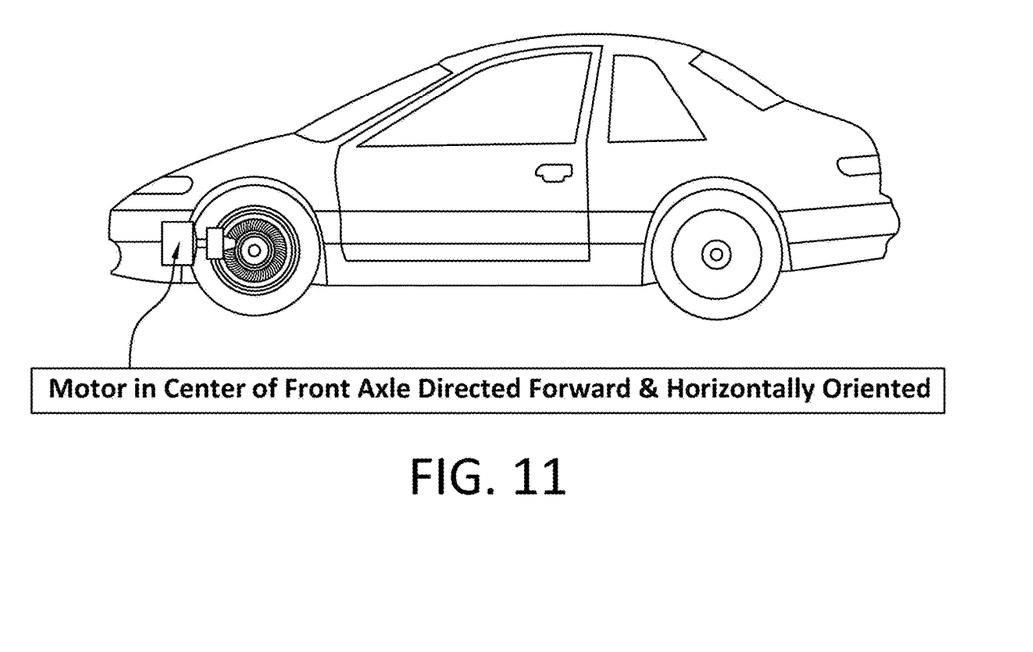
FIG. 11 illustrates an orientation of a hypoid transmission in front of axle.
Figure 12:
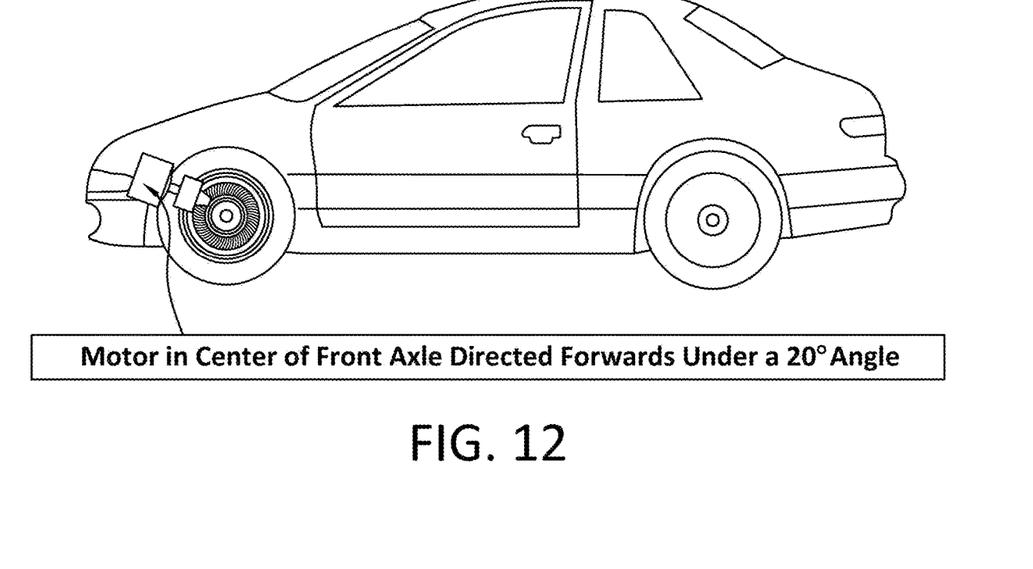
FIG. 12 illustrates an orientation of a hypoid transmission in front of axle and under an angle.

As previously mentioned, a hypoid reduction enables placement of the electric motor in the center of the front or rear axle between the wheels. The images of a small size compact sedan in FIGS. 11 and 12 show the electric motor in front of the front axle. With a battery location below the passenger cabin floor (between front and rear wheels), the motor orientation as shown in FIG. 11 presents a good weight distribution and could become part of the passive passenger impact safety concept. It is possible to reverse the direction of the hypoid offset (motor higher or lower) and find a packaging optimal motor orientation angle as shown in FIG. 12.

While it is preferred that the electric motor be oriented such that the drive shaft rotational axis is horizontal or parallel to the ground (e.g. parallel to a plane containing the front wheel axis and rear wheel axis of a vehicle standing on a flat level surface) as shown in FIG. 11, the invention is not limited thereto. The orientation of the electric motor may be angular such that the drive shaft rotational axis does not extend horizontal or parallel to the ground (not parallel to a plane containing the front wheel axis and rear wheel axis of a vehicle standing on a flat level surface) but at an angle thereto as is shown in FIG. 12.

Figure 13:
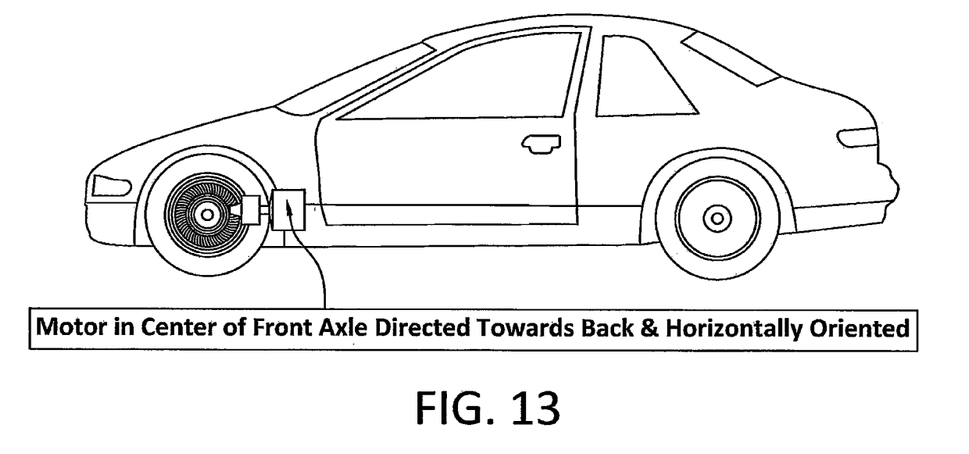
FIG. 13 shows an orientation of a hypoid transmission for a front wheel drive vehicle.
Figure 14:
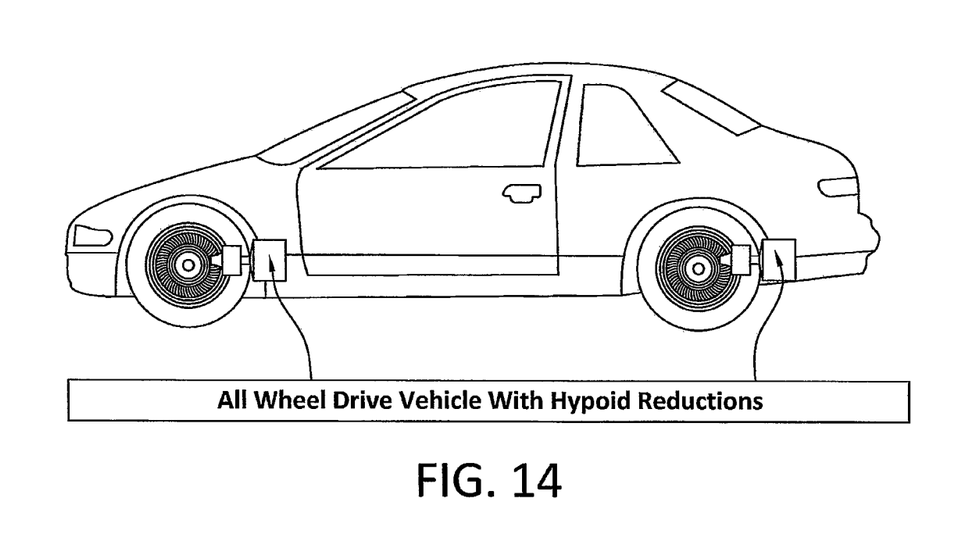
FIG. 14 shows an orientation of a hypoid transmission for all-wheel drive vehicle.

In case of an all-wheel drive passenger car, the same transmission unit which is propelling the front wheels can be used to propel the rear wheels as well. FIGS. 13 and 14 show a front wheel drive with the motor body pointing to the rear (FIG. 13) and an all-wheel drive arrangement with body of both motors pointing backwards (FIG. 14).

The arrangements shown in FIGS. 11-14 exemplify how compact the hypoid electric vehicle transmission (i.e. e-transmission) is and how well it can adjust to the given packaging constrains in a given overall vehicle concept. Other electric transmission orientations are possible which accomplished tailored solutions for all already existing electric vehicle designs.

The electric motor, or motors, of a vehicle may be located such that the rotational axis of the motor drive shaft extends in the lengthwise (longitudinal) direction of a vehicle with the motor drive shaft facing either toward the front or rear of the vehicle. Furthermore, while it is preferred that the ring gear of the transmission be located midway (i.e. center location in the widthwise direction of a vehicle) between the wheels it is intended to drive (see FIG. 4 for example), the invention is not limited thereto. The ring gear of the transmission may be located at any location along the wheel axis within a distance "d", in either direction, from the center location between a pair of wheels. The distance "d" is preferably not greater than 50 percent of the distance from the center location to each individual wheel. FIG. 4 shows an example of the distance "d".

The inventive hypoid reduction brings a variety of advantages. Symmetric weight distribution and reduced heat radiation exposure of the wheels and battery can be accomplished very well. The speed drop which is possible with the hypoid reduction is a multiple of what is conventionally realized for cylindrical gearsets (ratios between 6 and 15 have been realized for the present inventive electric drive developments). This makes it possible for small size compact vehicles to limit the transmission to one fixed but large ratio. The result is a simple and low cost transmission with a motor shaft also being a pinion shaft and with only one additional shaft for the ring gear. Of course, just like in all axle drives with hypoid gears, the differential cage fits conveniently inside of the pinion-ring gear silhouette (see 15 in FIG. 3) without additional space consumption.

Figure 15:
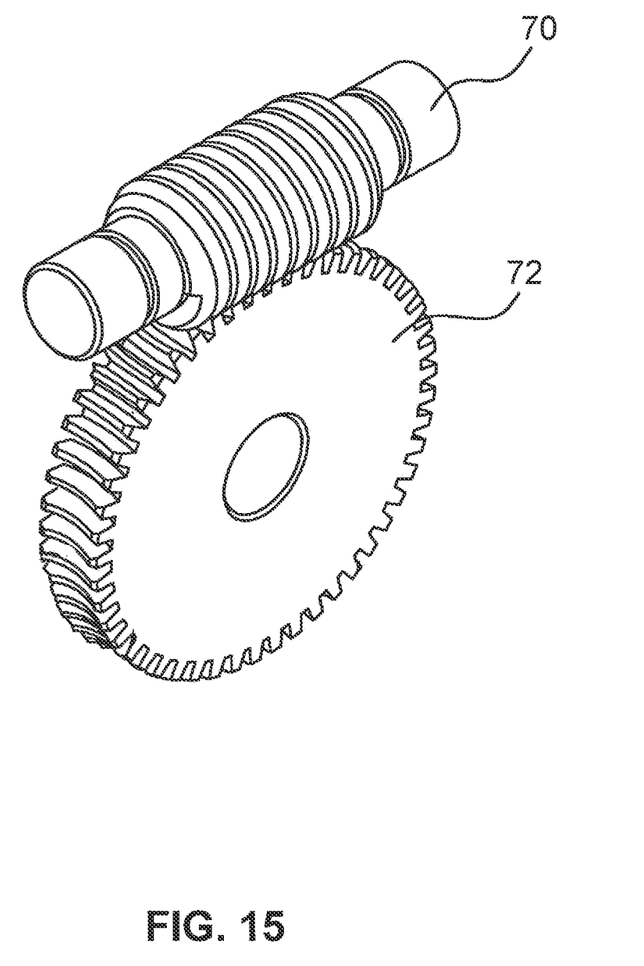
FIG. 15 shows a gearset comprising a worm and worm wheel as an alternative to a ring gear and hypoid pinion.

Although the invention has been discussed with reference to bevel gearsets comprising a ring gear and hypoid pinion, the invention is not limited thereto. Other gearsets such as a worm 70 and worm wheel 72 as shown in FIG. 15, for example, or a face gear and offset cylindrical pinion are also contemplated. Spiral bevel and straight bevel gearsets may also be utilized particularly in combination with a dual-stage or planetary reduction as shown in FIGS. 6, 7 and 8 for example.

While it is preferred that the drive shaft rotational axis of the electric motor, $A_m$, and the axis of the wheels, $A_w$, be perpendicular as shown in FIG. 4, for example, the invention is not limited thereto. The motor drive shaft axis, $A_m$, may be oriented by up to as much as plus/minus ($\pm$) 45 degrees from the perpendicular orientation (e.g. FIG. 4) of drive shaft rotational axis $A_m$ with respect to the wheel axis, $A_w$. In other words, the drive shaft axis, $A_m$, of the electric motor may be oriented at any angle within the range of 45 degrees to 135 degrees with respect to the wheel axis $A_W$. An appropriate cone angle change of the ring gear and pinion would accompany such a change in drive shaft axis orientation.

Compared to a conventional vehicle driveline comprising a motor, transmission or gearbox, differential, axles and wheels, the invention essentially eliminates the need for separate transmission (or gearbox) and differential components. In general, the inventive transmission effectively combines transmission and differential components into a single component which is particularly beneficial for electric vehicles as it provides freedom for motor placement and orientation. This is possible due to the utilization of a hypoid pinion having a low number of teeth and a high gearset ratio particularly for the inventive transmission having a single stage reduction.

While the preferred utility of the inventive transmission is to receive input power from an electric motor such as for driving a car or truck, for example, the transmission is also contemplated for use in vehicles where the prime mover is of a type other than electric or solely electric, such as hybrid vehicles or fuel cell driven vehicles.

While the invention has been described with reference to preferred embodiments it is to be understood that the invention is not limited to the particulars thereof. The present invention is intended to include modifications which would be apparent to those skilled in the art to which the subject matter pertains without deviating from the spirit and scope of the appended claims.

What is claimed is:

1. A vehicle being moveable by power provided by at least one electric motor having a drive shaft, said vehicle having a pair of rotatable wheels being rotatable via power provided by said at least one electric motor, said pair of rotatable wheels being located spaced apart in a widthwise direction of said vehicle along a common axis ($A_W$), said vehicle further comprising a transmission, said transmission providing drive reduction with defined back driving ability and comprising an input having an input axis of rotation and at least one pair of mating gears with one of the pair of mating gears being an offset pinion having an axis of rotation ($A_P$) defining said input axis of rotation, said transmission being located centered between the pair of wheels or at a distance (d) from the centered location, said distance (d) being equal to or lower than 50 percent of the distance from the centered location to each individual wheel of the pair and said transmission further comprising at least one output with said at least one output having an output axis of rotation and being rotatably connected to each of the pair of wheels by a respective axle, wherein said transmission has a reduction ratio in the range of 7.86 to 15, characterized in that the back driving ability, expressed as Back Driving Coefficient $C_{BD}$ being the ratio of back driving opposing force to back driving force, is given by $C_{BD}$ being lower than 0.336 while said offset pinion comprises only 2 to 5 teeth.

2. The vehicle of claim 1 wherein the other of said pair of mating gear comprises a bevel ring gear having an axis of rotation ($A_T$) defining said output axis of rotation, and wherein said offset pinion comprises a hypoid bevel pinion.

3. The vehicle of claim 2 wherein the offset pinion axis ($A_P$) is oriented perpendicular to the ring gear axis ($A_T$) or +45 degrees with respect to perpendicular to the ring gear axis ($A_T$).

4. The vehicle of claim 2 wherein the ring gear axis of rotation ($A_T$) is parallel to the common axis ($A_W$).

5. The vehicle of claim 1 wherein the drive shaft of said at least one electric motor is rotatably connected to said hypoid pinion, said drive shaft comprising a drive shaft axis of rotation ($A_m$) with said drive shaft axis of rotation ($A_m$) being coincident with the pinion axis ($A_P$).

6. The vehicle of claim 5 having a front and a back with a lengthwise direction defined between the front and the back, said at least one electric motor being positioned in said vehicle whereby said drive shaft axis of rotation ($A_m$) is oriented in said lengthwise direction.

7. The vehicle of claim 1 further comprising at least one additional pair of reduction gears.

8. The vehicle of claim 1 further including an additional reduction gearing comprising a planetary gear system.

9. The vehicle of claim 1 comprising a first electric motor for driving a front pair of wheels and a second electric motor for driving a rear pair of wheels.

10. The vehicle of claim 1 comprising a single stage transmission.

11. The vehicle of claim 10 comprising one electric motor and one single stage hypoid transmission.

12. The vehicle of claim 1 wherein said at least one pair of mating gears comprises a face gear and an offset mating cylindrical pinion.

13. The vehicle of claim 1 wherein said at least one pair of mating gears comprises a worm and worm wheel.

\* \* \* \* \*